(12) United States Patent
Somanath et al.

(10) Patent No.: US 11,397,134 B2
(45) Date of Patent: Jul. 26, 2022

(54) INTELLIGENT LEARNING DEVICE FOR PART STATE DETECTION AND IDENTIFICATION

(71) Applicant: United Technologies Corporation, Farmington, CT (US)

(72) Inventors: Nagendra Somanath, South Windsor, CT (US); Anya B. Merli, Wethersfield, CT (US); Ryan B. Noraas, Hartford, CT (US); Michael J. Giering, Bolton, CT (US); Olusegun T. Oshin, Manchester, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 868 days.

(21) Appl. No.: 16/207,452

(22) Filed: Dec. 3, 2018

(65) Prior Publication Data
US 2020/0173885 A1    Jun. 4, 2020

(51) Int. Cl.
*G01M 15/14* (2006.01)
*G06N 3/04* (2006.01)
*G06N 3/08* (2006.01)

(52) U.S. Cl.
CPC ............ *G01M 15/14* (2013.01); *G06N 3/04* (2013.01); *G06N 3/08* (2013.01); *G06T 2207/20084* (2013.01)

(58) Field of Classification Search
USPC .......................................................... 702/34
See application file for complete search history.

(56) References Cited

U.S. PATENT DOCUMENTS

| 2013/0080984 A1* | 3/2013 | Liu ..................... G06F 30/23 716/112 |
| 2017/0323231 A1* | 11/2017 | Johnson .......... G06Q 10/06314 |
| 2017/0364792 A1* | 12/2017 | Chai .................... G06N 3/063 |
| 2018/0268288 A1* | 9/2018 | Vandike ................... F02C 9/00 |

(Continued)

FOREIGN PATENT DOCUMENTS

| WO | 2018165753 | 9/2018 |
| WO | 20180169722 | 9/2018 |

OTHER PUBLICATIONS

Onal, Okan, Ali Ugur Ozturk, Artificial neural network application on microstructure-compressive strength relation of cement mortar, Advances in Engineering Software, Oct. 8, 2009, p. 1-5 (Uncorrected proof).

(Continued)

*Primary Examiner* — Paul D Lee
(74) *Attorney, Agent, or Firm* — Carlson, Gaskey & Olds, P.C.

(57) ABSTRACT

A tool for monitoring a part condition includes a computerized device having a processor and a memory. The computerized device includes at least one of a camera and an image input and a network connection configured to connect the computerized device to a data network. The memory stores instructions for causing the processor to perform the steps of providing an initial micrograph of a part to a trained model, providing a data set representative of operating conditions of the part to the trained model, and outputting an expected state of the part from the trained model based at least in part on the input data set and the initial micrograph.

14 Claims, 3 Drawing Sheets

(56) References Cited

U.S. PATENT DOCUMENTS

2020/0166909 A1* 5/2020 Noone ............. G05B 19/41875

OTHER PUBLICATIONS

Svensen, Markus, David S. Hardwick, and Honor E. G. Powrie, Deep Neural Networks Analysis of Borescope Images, European Conference of the Prognostics and Health Management Society 2018, GE Aviation Digital, Eastleigh, Hampshire, United Kingdom.
Kingma, Diederik P. et al., Glow: Generative Flow with Invertible 1×1 Convolutions, arxiv.org, Cornell University Library, 201 Olin Library Cornell University Ithaca, NY 14853, Jul. 9, 2018 (Jul. 9, 2018), XP081245422.
Noraas, Ryan et al., Structural Material Property Tailoring Using Deep Neural Networks, AIAA SCITECH 2019 Forum, Jan. 7, 2019 (Jan. 7, 2019), XP055671173, Reston, Virginia, DOI: 10.2514/6.2019-1703, ISBN: 978-1-62410-578-4.
European Search Report for Application No. 19212739.7 dated May 12, 2020.

* cited by examiner

INTELLIGENT LEARNING DEVICE FOR PART STATE DETECTION AND IDENTIFICATION

TECHNICAL FIELD

The present disclosure relates generally to predicting a materials state of a part, and more specifically to making such a prediction with the assistance of a trained neural network.

BACKGROUND

Gas turbine engines, such as those utilized in commercial and military aircraft, include a compressor section that compresses air, a combustor section in which the compressed air is mixed with a fuel and ignited, and a turbine section across which the resultant combustion products are expanded. The expansion of the combustion products drives the turbine section to rotate. As the turbine section is connected to the compressor section via a shaft, the rotation of the turbine section further drives the compressor section to rotate. In some examples, a fan is also connected to the shaft and is driven to rotate via rotation of the turbine as well.

Gas turbine engines include multiple engine components, each of which are exposed to extreme stresses during operation of the engine. The exposure to extreme stresses gradually wears the parts, and can in some examples alter the material composition of the parts. In existing systems, physics based models are used to determine a time period before the product is too worn to be included in the engine based on expected operation times, and the part is scheduled to be replaced or repaired at or before the expiration of the time period.

Current models for determining the life of the part are incapable of predicting the impact that the wear has on the underlying microstructure of the part and are incapable of factoring non-engine parameters such operational environment, time between usage, storage conditions, and the like. As a result, current models utilize a conservative worst case scenario estimate based on the physics based models to schedule maintenance for any given component.

SUMMARY OF THE INVENTION

An exemplary method for analyzing a part includes providing an initial micrograph of a part to a trained model, providing a data set representative of operating conditions of the part to the trained model, and outputting an expected state of the part from the trained model based at least in part on the input data set and the initial micrograph.

In another example of the above described exemplary method for analyzing a part the trained model is a trained generative flow neural network.

In another example of any of the above described exemplary methods for analyzing a part the expected state of the part includes at least one simulated micrograph of the part.

Another example of any of the above described exemplary methods for analyzing a part further includes determining at least one expected parameter of the part based on the simulated micrograph.

In another example of any of the above described exemplary methods for analyzing a part the training process includes generating a plurality of artificial material samples based on a plurality of authentic samples.

In another example of any of the above described exemplary methods for analyzing a part at least a portion of the artificial samples are generated using a physics based model.

In another example of any of the above described exemplary methods for analyzing a part at least a portion of the artificial samples are generated using a neural network based model.

Another example of any of the above described exemplary methods for analyzing a part further includes at least one of updating and replacing the artificial material samples with subsequently obtained authentic samples.

Another example of any of the above described exemplary methods for analyzing a part further includes determining a predicted life of the part based on the expected state of the part and determining a maintenance schedule for the part based on the predicted life of the part.

In one exemplary embodiment a tool for monitoring a part condition includes a computerized device including a processor and a memory, at least one of a camera and an image input, a network connection configured to connect the computerized device to a data network, wherein the memory stores instructions for causing the processor to perform the steps of providing an initial micrograph of a part to a trained model, providing a data set representative of operating conditions of the part to the trained model, and outputting an expected state of the part from the trained model based at least in part on the input data set and the initial micrograph.

In another example of the above described tool for monitoring a part condition the initial micrograph is an actual micrograph of a part and is received at the computerized device through the at least one of the camera and the image input.

In another example of any of the above described tools for monitoring a part condition the initial micrograph is an image generated by the camera.

In another example of any of the above described tools for monitoring a part condition the initial micrograph is one of a surface image of the part, an internal image of the part, and a non-destructive image of the part microstructure.

In another example of any of the above described tools for monitoring a part condition the data set representative of the operating conditions is a set of sensor data received from an aircraft controller, and is received through a data input of the tool.

In another example of any of the above described tools for monitoring a part condition the expected state of the part includes a simulated micrograph.

In another example of any of the above described tools for monitoring a part condition the memory further stores instructions configured to cause the processor to update a learning population of the trained model.

Another example of any of the above described tools for monitoring a part condition further includes a product life management system connected to the data network.

These and other features of the present invention can be best understood from the following specification and drawings, the following of which is a brief description.

DETAILED DESCRIPTION

Figure 1:
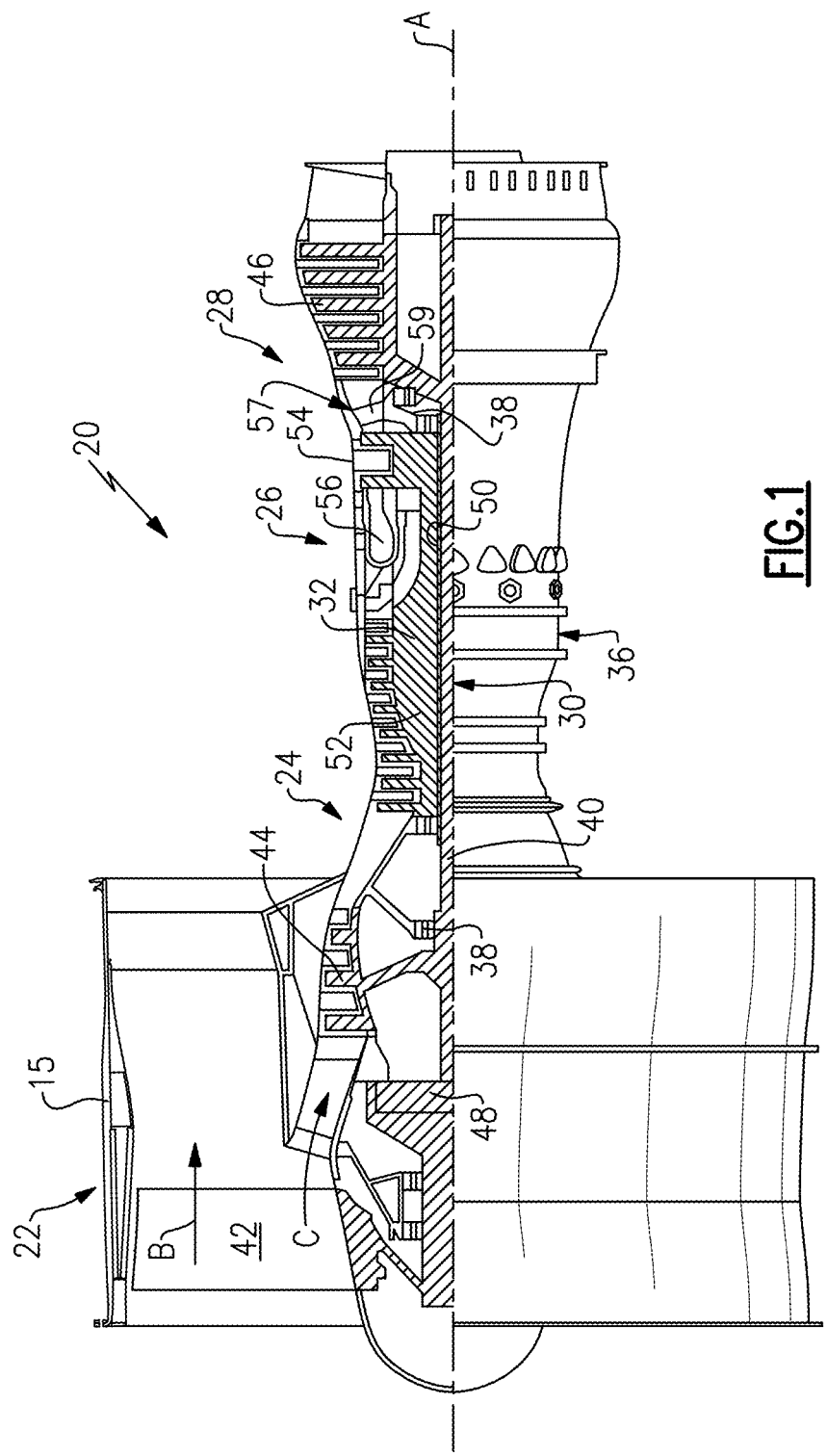
FIG. 1 illustrates an exemplary gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a nacelle 15, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram° R)/(518.7° R)]^{0.5}$. The "Low corrected fan tip speed" as disclosed herein according to one non-limiting embodiment is less than about 1150 ft/second (350.5 meters/second).

Within the gas turbine engine 20 are multiple blades, stators, vanes, and the like that are exposed to extreme temperatures and other extreme operating conditions. Among the parts are several parts or types of parts that are constructed using materials where the underlying microstructure of the material has an impact on the part durability and the ability of the part to perform. Further, exposure to the extreme conditions of the gas turbine engine 20 can result in changes to the underlying microstructure. The changes to the microstructure impact the strength and durability, as well as any number of other parameters of the part, and can impact the life expectancy of the part.

Figure 3:
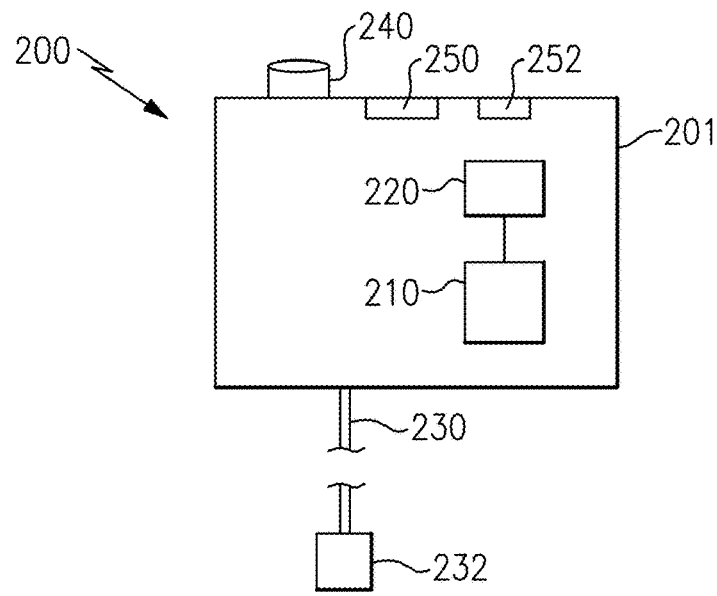
FIG. 3 schematically illustrates an exemplary tool for implementing method of FIG. 2.

In order to more accurately predict the life cycle of the parts, a neural network, such as a deep generative neural network (alternately referred to as a flow model neural network) is trained to predict an expected microstructural change in a component having a starting microstructure and expected to operate within known parameters. The flow model neural network is incorporated in, or interfaced with, an intelligent portable learning and part life assessment device (FIG. 3).

Figure 2:
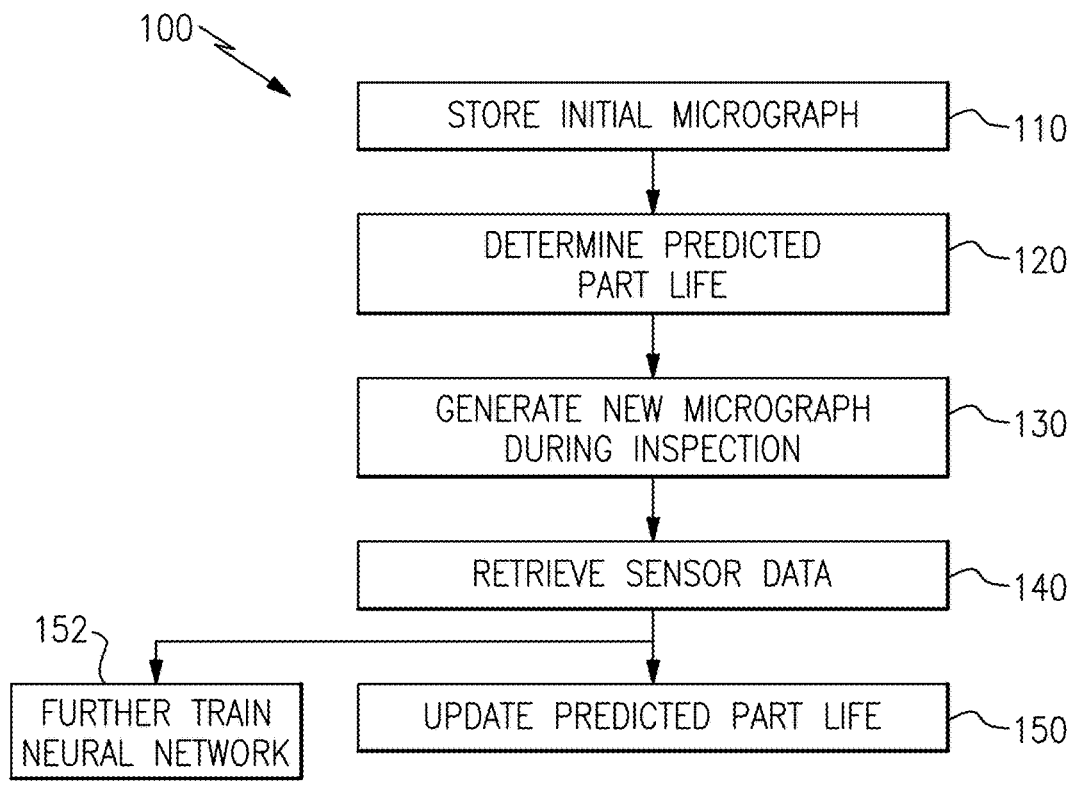
FIG. 2 illustrates an exemplary method for utilizing a trained neural network to estimate and update an expected part life.

With continued reference to FIG. 1, FIG. 2 illustrates an exemplary method for evaluating a component state using a previously trained flow model neural network. Initially the method 100 stores an image (micrograph) of the part prior to any usage in a "Store Initial Micrograph" step 110. Based on the initial micrograph, and the expected operating conditions of the part, the trained flow model neural network determines a predicted part life in a "Determine Predicted Part Life" step 120. The predicted part life is determined by using the flow model neural network to provide one or more simulated micrographs, based on the actual initial micrograph and an expected exposure to engine operational parameters. The simulated micrographs are generated for periodic time intervals, with the frequency of the simulated micrographs being based on an expected rate of change of the underlying microstructure. Each of the predicted micrographs is then analyzed using the neural network, a physics based model, or a combination thereof, to determine the physical parameters of the microstructure shown in the predicted micrographs.

A maintenance schedule is determined for the part using any known maintenance schedule determination based on the physical parameters, and the maintenance schedule defines the predicted part life. Once the maintenance schedule is determined, the trained flow model neural network generates an expected micrograph of the part at each of the maintenance intervals where one has not already been generated.

During inspection at each maintenance interval, a new micrograph is generated in a "Generate New Micrograph During Inspection" step 130. As the new micrograph is an image of the actual worn part, the new micrograph is referred to as an authentic micrograph, and the authentic micrograph replaces the corresponding simulated. During the same inspection, sensor data indicative of the engine operations is retrieved from the engine controller in a "Retrieve Sensor Data" step 140. The retrieved sensor data is referred to as authentic operating conditions. It is appreciated that the specific sensor data retrieved is dependent on the part being analyzed and the sensor data available from the engine controller.

Once the sensor data has been retrieved and the authentic micrograph has been generated, both are provided to the trained flow model neural network and the flow model neural network generates a new predicted part life of the part, based on the new authentic micrograph and on the sensor data in an "Update Predicted Part Life" step 150 using the process previously described. The updated predicted part life includes expected changes to the underlying part microstructure based on the initial micrograph, all updated authentic micrographs, and the authentic operating conditions to which the part has been exposed. In addition to updating the predicted part life, the new authentic micrograph, and the paired sensor data from the engine controller is provided back to a learning population of the flow model neural network, and further trains the flow model neural network in a "Further Train Neural Network" step 152.

In some examples, the micrographs utilized in the method 100 are surface images of the part. In other examples, the micrographs are interior images of the part generated via a probe. In yet further examples, the micrographs are images of the part microstructure and can be generated using a non-destructive image generation technique.

In yet further examples, where the part is being replaced, rather than being repaired or returned to the engine, the micrograph can be an image of the part microstructure and can be generated via a destructive image generation technique. In such examples, the predicted part life is not updated, however the data is provided to the learning population to further train the flow generated neural network.

With continued reference to FIG. 2, FIG. 3 schematically illustrates an exemplary product life analysis tool that incorporates and utilizes the method 100 of FIG. 2. The tool 200 includes a computer 201 having a processor 210 and a memory 220. In some examples, the trained flow model neural network is stored in the memory 220, and the method 100 is performed entirely at the computer 201. In alternative examples, the flow model neural network is stored at a central computer 232 server and the computer 200 is interfaced with the central computer 232 or server via a network connection 230. In yet further examples the flow model neural network is operated using a cloud based service, which is also connected to through the network connection 230.

In the exemplary embodiment, the product life analysis tool 200 includes a camera 240, and at least one data input port 250. The camera 240 is configured to generate an authentic micrograph via at least one of a surface image capture, an internal probe image capture and a non-destructive microstructure image capture. In alternative examples, the camera 240 can be replaced with an image input configured to receive, or a supplementary input 252 can be configured to receive, an authentic micrograph generated from another source.

The computer 201 can be a desktop computer, a handheld device, such as a tablet, or any other similar computing device. The processor 210 and the memory 220 are configured to perform the method 100, illustrated in FIG. 2, and provide the updated predicted part life to a part life management system through the network connection 230. In some examples, the part life management system is a program, or set of programs, on the central computer 232. In other examples, the part life management system is a distinct hardware and/or software system connected to the network.

Figure 4:
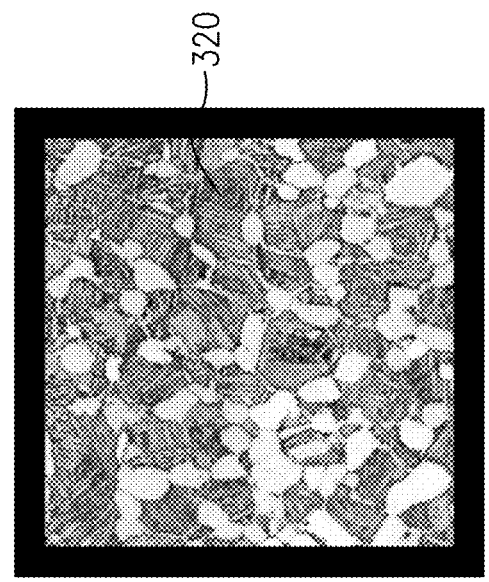
FIG. 4 schematically illustrates an exemplary latent material space, and an exemplary micrograph of a generative neural network.
Figure 4:
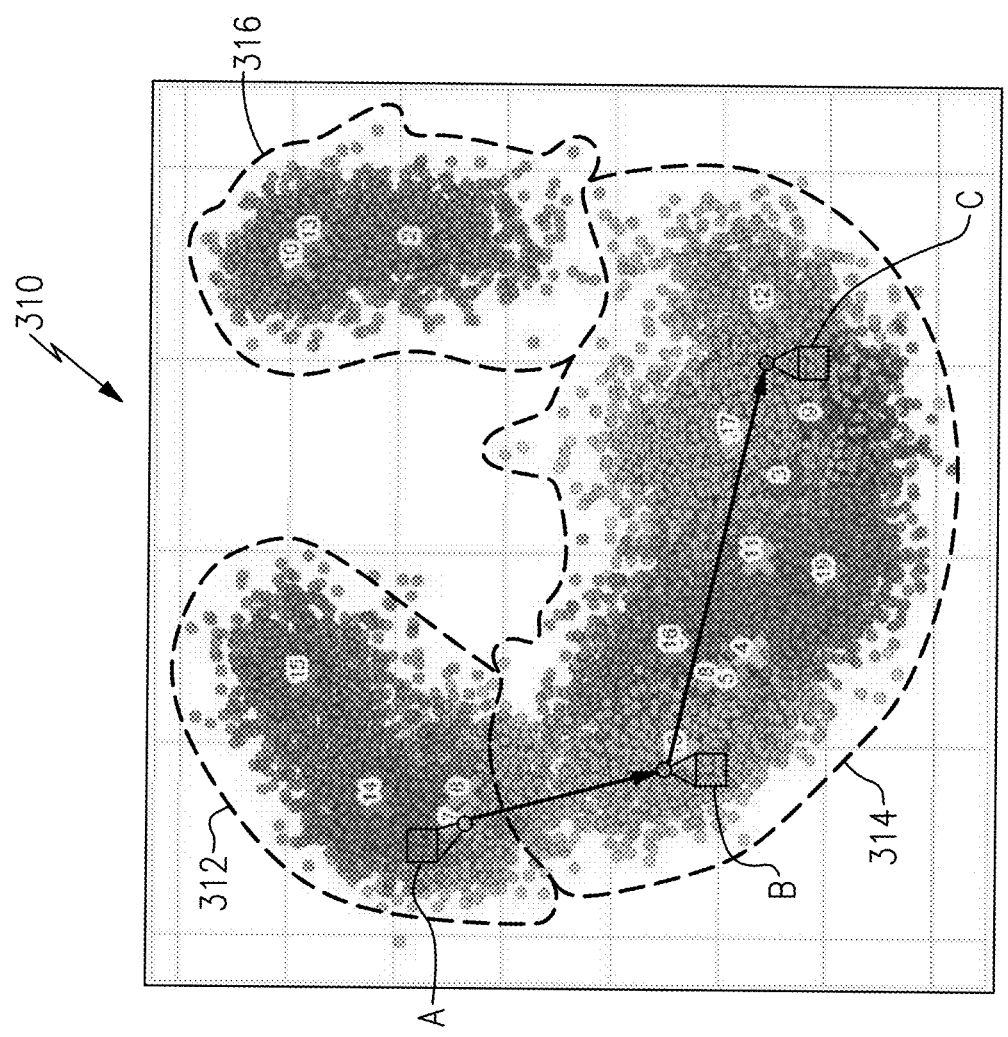

With continued reference to FIGS. 1-3, the following is a description of an exemplary neural network and an exemplary neural network training for implementing the trained neural network utilized by the tool 200. The neural network is discussed with reference to an exemplary latent material space plot 310 and exemplary micrograph 320 illustrated in FIG. 4. As described above, the device 200 and method 100 utilize a generative flow neural network (alternately referred to as a flow model neural network) that is trained for detection and identification of part microstructures. The neural network is configured to work with real time image identification, classification and learning.

The generative flow neural network includes multiple layers for real time artificial intelligence processing and data driven detection and identification using simultaneous learning. The generative flow neural network model is a deep generative neural network referred to as a flow-model. Flow models derive their name from their use of modular bijective (invertible) units comprised of a sequence of non-linear transformations.

Modules are composed of a repeating hierarchical structure of operations to create a full model. This is analogous to the repeating structures of convolutional neural networks, although not identical. The elements of a generative flow neural network are: First, a data normalization algorithm necessitated by the small batch sizes used when learning to model large images. Second, an invertible 1×1 convolution to utilize low computational cost non-linear transformations. Third, additive coupling layers which provide a method to drive variation in the training data and allow for faster convergence and more robust models.

The generative flow neural network is capable of working within cloud infrastructures to process live data streams of images, sensor streams or user interactions, thereby enabling the tool 200 to utilize the trained generative flow neural network without requiring the tool 200 to store the entirety of the generative flow neural network locally.

With regards to a training data set, each micrograph has associated stress states and hysteresis due in part to the operational time and loading evolution of the specific material. The stress states are visible in the micrograph and can be detected and analyzed by the generative flow neural network. The micrographs have stored the hysteresis state as a frozen stress reflected by the change in grain boundary location and constituent shape location over time.

In order to pre-train the generative flow neural network a data set of known actual data is provided to a training operation of the generative flow neural network. The data set includes micrograph images of part microstructures. By way of example, one generative flow neural network training set includes 10,000 micrographs of 20 alloy types. Further, the trained model is capable of generating new alloy images as well as reproducing any images from the original input training set.

As an extension of this training process, the generative model can be further conditioned on additional information that can be any descriptive attribute of interest. By way of example, the additional information may be alloy pedigree, processing parameters such as temperature, cooling rates etc. New simulated micrograph images (referred to as artificial material samples) can be generated with these additional attributes associated with the input data points using the trained neural network, a physics based model, or a combination of the two. By way of example, the training process can generate images for each pedigree, or with enough data, ask the model to generate a micrograph for a material made with specific processing parameters. The simulated micrograph images are utilized to further enhance the learning set of the neural network.

Further, having the latent representation Z of X allows exploration of regions of a material space (multi-dimensional plots of material characteristics) corresponding to materials that there are no actual micrographs of, but which lie between regions in the multi-dimensional plot for which we do have supporting actual micrographs. The utilization of latent variables enables collapsing the number of dimensions of the design space into a manageable number, while still retaining the relevant information of each dimension.

A generative neural network can accommodate a morphology constraint that further refines the artificial microstructures under a smaller amount of training data. By way of example, the generative neural network such as the neural network described with regards to FIGS. 2 and 3 can be trained with as few as 15 data points in the learning set. The neural network described herein can be used to extract of low dimensional material representations, and is capable of generating expected microstructures with morphologies of decent complexity.

Within the training set, a sequence of the photo micrographs of each sample captures the time history of the alloy in that specific sample and the associated stress states depending on the time at which the photo micrograph was taken. In other words, each sample within the training set includes multiple micrographs in sequential time order, with each micrograph including associated actual operational data of the sample.

The neural network develops and trains the 1×1 convolution neural net based on the micrographs in each sample size to identify a Latent Material Space (LMS) 310 with the baseline data from pristine material and time interval based service life exposed micrographs, such as the example micrograph 320. By way of example, different fatigue strengths will have different regions in the Latent Material Space (LMS) 310. A first region 312 is a high fatigue strength space, a second region 314 is a medium fatigue strength space and the remaining region 316 is a poor fatigue strength space. Alternate embodiments can utilize more, or less, regions depending on the particular parameter(s) being considered. While described here using the exemplary parameter of fatigue strength, a Latent Material Space (LMS) can be generated using the generative neural network for any corresponding parameter.

By using the Latent Material Space (LMS), varying micro-state structures and alloy grain boundaries of several parameters can be garnered and appropriate material composition location can be established as a baseline reference and estimate nature of the part at any time instant by traversing from point A to point B to point C. At any location (point A, point B, point C, or any other location in the latent material space) the directional probability density of a physical property (e.g. material moduli or strength) or response quantity (egg creep, fatigue, etc.) will depend on the material constituents, grain boundary toughness and their respective percentages of the alloy constituents.

The generative neural network evaluation processes streamlines visual inspection methods. The trained generative neural network is capable of generating realistic high resolution micrographs of an expected state of the part material. The generative neural network allows exact correspondence between input data points, such as actual micrographs and actual operational data, and their equivalent representations in the latent material space 310. Using the limited data of the training set, the algorithm of the generative neural network can generate high resolution expected micrograph images from a small number of apriori images of the inspection processes. The expected micrograph images can then be reviewed according to the known models to determine the material properties and expected part lives. By utilizing a generative neural network, that is capable of generating the expected micrographs, the system described herein can be initiated using significantly fewer training images in comparison with alternative neural network types.

While the system and method is discussed herein within the context of a geared turbofan engine, one of skill in the art will appreciate that the disclosure applies to any number of aircraft engines, or other turbine types, and is not limited in its application. Further, while described herein with regards to component microstructures, the same analysis and training can be applied to any number of visual elements including surface inspections, or any combination of elements that can be visually represented.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A method for analyzing a part comprising:
   providing an initial micrograph of a part to a trained model wherein the trained model is a trained generative flow neural network;
   providing a data set representative of operating conditions of the part to the trained model; and
   outputting an expected state of the part from the trained model based at least in part on the input data set and the initial micrograph, the expected state of the part includes at least one simulated micrograph of the part.

2. The method of claim 1, further comprising determining at least one expected parameter of the part based on the simulated micrograph.

3. The method of claim 1, further comprising determining a predicted life of the part based on the expected state of the part and determining a maintenance schedule for the part based on the predicted life of the part.

4. A method for analyzing a part comprising:
providing an initial micrograph of a part to a trained model, wherein the trained model is a trained generative flow neural network, and a training process for training the trained model includes generating a plurality of artificial material samples based on a plurality of authentic samples;
providing a data set representative of operating conditions of the part to the trained model;
outputting an expected state of the part from the trained model based at least in part on the input data set and the initial micrograph.

5. The method of claim 4, wherein at least a portion of the artificial samples are generated using a physics based model.

6. The method of claim 4, wherein at least a portion of the artificial samples are generated using a neural network based model.

7. The method of claim 4, further comprising at least one of updating and replacing the artificial material samples with subsequently obtained authentic samples.

8. A tool for monitoring a part condition comprising:
a computerized device including a processor and a memory;
at least one of a camera and an image input;
a network connection configured to connect the computerized device to a data network;
wherein the memory stores instructions for causing the processor to perform the steps of
providing an initial micrograph of a part to a trained model;
providing a data set representative of operating conditions of the part to the trained model; and
outputting an expected state of the part from the trained model based at least in part on the input data set and the initial micrograph, the expected state of the part including a simulated micrograph.

9. The tool of claim 8, wherein the initial micrograph is an actual micrograph of a part and is received at the computerized device through the at least one of the camera and the image input.

10. The tool of claim 9, wherein the initial micrograph is an image generated by the camera.

11. The tool of claim 9, wherein the initial micrograph is one of a surface image of the part, an internal image of the part, and a non-destructive image of the part microstructure.

12. The tool of claim 9, wherein the data set representative of the operating conditions is a set of sensor data received from an aircraft controller, and is received through a data input of the tool.

13. The tool of claim 8, wherein the memory further stores instructions configured to cause the processor to update a learning population of the trained model.

14. The tool of claim 8, further comprising a product life management system connected to the data network.

* * * * *